US009430419B2

(12) United States Patent
Jones et al.

(10) Patent No.: US 9,430,419 B2
(45) Date of Patent: Aug. 30, 2016

(54) SYNCHRONIZING EXCEPTION CONTROL IN A MULTIPROCESSOR SYSTEM USING PROCESSING UNIT EXCEPTION STATES AND GROUP EXCEPTION STATES

(75) Inventors: Simon Jones, London (GB); Joe Dominic Michael Tapply, Great Wilbraham (GB)

(73) Assignee: ARM Limited, Cambridge (GB)

( * ) Notice: Subject to any disclaimer, the term of this patent is extended or adjusted under 35 U.S.C. 154(b) by 1005 days.

(21) Appl. No.: 13/317,246

(22) Filed: Oct. 13, 2011

(65) Prior Publication Data

US 2012/0102303 A1   Apr. 26, 2012

(30) Foreign Application Priority Data

Oct. 22, 2010 (GB) .................................. 1017853.1

(51) Int. Cl.
*G06F 13/24* (2006.01)
*G06F 15/16* (2006.01)
(52) U.S. Cl.
CPC ................ *G06F 13/24* (2013.01); *G06F 15/16* (2013.01)
(58) Field of Classification Search
CPC ...................................................... G06F 13/24
USPC ........................................................ 712/241
See application file for complete search history.

(56) References Cited

U.S. PATENT DOCUMENTS

| | | | | |
|---|---|---|---|---|
| 3,949,371 | A * | 4/1976 | Pederzini | 710/44 |
| 5,193,187 | A | 3/1993 | Strout, II et al. | |
| 5,537,562 | A * | 7/1996 | Gallup et al. | 712/234 |
| 5,805,470 | A * | 9/1998 | Averill | 703/27 |
| 6,195,676 | B1 * | 2/2001 | Spix et al. | 718/107 |
| 6,691,223 | B1 * | 2/2004 | Ganesan et al. | 712/244 |
| 2003/0093579 | A1 | 5/2003 | Zimmer et al. | |
| 2006/0020852 | A1 | 1/2006 | Bernick et al. | |
| 2007/0079150 | A1 * | 4/2007 | Belmont et al. | 713/300 |
| 2007/0150632 | A1 * | 6/2007 | Ayyar et al. | 710/260 |
| 2008/0034193 | A1 * | 2/2008 | Day et al. | 712/244 |

(Continued)

FOREIGN PATENT DOCUMENTS

| | | |
|---|---|---|
| CN | 100524223 | 8/2009 |
| GB | 2442354 | 4/2008 |

(Continued)

OTHER PUBLICATIONS

System Management Mode, Aug. 17, 2009, Wikipedia, pp. 1-3.*

(Continued)

*Primary Examiner* — Andrew Caldwell
*Assistant Examiner* — Jyoti Mehta
(74) *Attorney, Agent, or Firm* — Nixon & Vanderhye P.C.

(57) ABSTRACT

A data processing apparatus is provided with a plurality of processing units executing respective streams of program instructions corresponding to respective processing threads. Exception control circuitry controls exception processing for a group of the processing units in response to an exception triggering event. Each of the processing units moves only once and in sequence between normal, in-exception, and done-exception states in response to a given exception event. A group of processing units moves in sequence between states normal, triggering, and completing in response to the exception event. A counter value is used to track the number of processing units which have entered exception processing and then to track the number of processing units which have completed their exception processing.

17 Claims, 7 Drawing Sheets

(56) References Cited

U.S. PATENT DOCUMENTS

| | | | | |
|---|---|---|---|---|
| 2008/0109674 A1* | 5/2008 | Levine et al. | | 713/503 |
| 2009/0172228 A1* | 7/2009 | Zimmer | | G06F 9/4405 710/260 |
| 2009/0172229 A1* | 7/2009 | Zmudzinski | | 710/260 |
| 2009/0327554 A1* | 12/2009 | Diaz et al. | | 710/267 |
| 2010/0115236 A1* | 5/2010 | Bataineh et al. | | 712/29 |

FOREIGN PATENT DOCUMENTS

| | | |
|---|---|---|
| JP | 5-508046 | 11/1993 |
| JP | 2010-015364 | 1/2010 |
| JP | 2010-525440 | 7/2010 |
| WO | 91/20042 | 12/1992 |
| WO | WO 2004/017204 | 2/2004 |

OTHER PUBLICATIONS

UK Search Report for 1017853.1, dated Feb. 7, 2011.
International Search Report and Written Opinion of the International Searching Authority dated Dec. 7, 2011 for PCT/GB2011/051593.
English translation of Taiwanese Office Action dated Jan. 28, 2015 in TW 100136555, 7 pages.
Chinese Office Action dated Mar. 24, 2015 in CN 201180048212.1 and English translation, 22 pages.
Japanese Office Action dated Nov. 4, 2014 in JP 2013-534378 and English translation, 23 pages.

\* cited by examiner

Control Group State Moving to Completing

Control PU State Moving to Done_Exception

SYNCHRONIZING EXCEPTION CONTROL IN A MULTIPROCESSOR SYSTEM USING PROCESSING UNIT EXCEPTION STATES AND GROUP EXCEPTION STATES

This application claims priority to GB Application No. 1017853.1 filed 22 Oct. 2010, the entire contents of which are incorporated herein by reference.

BACKGROUND OF THE INVENTION

1. Field of the Invention

This invention relates to the field of data processing systems. More particularly, this invention relates to the control of exception processing within data processing systems.

2. Description of the Prior Art

It is known to provide data processing systems including multiple processing units each executing .a stream of program instructions corresponding to a processing thread. Examples of such systems are graphics processing units which often include a large number of graphics processing cores each executing a stream of program instructions performing a different part of the overall processing being performed by the graphics processing unit. An example is where tile-based graphics processing is performed and each graphics processing core performs an operation, such as a shading operation, upon a different tile within the overall image. Another example of a system including multiple processing units is. symmetric multiprocessing system as are becoming increasingly common for general purpose processing. Within such systems it is known that different parts of the processing may be performed upon different processing units, for example one processor core may be dedicated to calculating numerical results and another processor core may be dedicated to generating the graphical data for displaying those numerical results.

It is also known within the field of data processing that a processor may be subject to an interrupt signal, which serves to interrupt the current processing being performed and redirect program flow to execution of exception handling code. Such interrupts are frequently found within real-time processing systems for dealing with physical events. It is also possible to use interrupt for controlling scheduling within multi-tasking systems.

SUMMARY OF THE INVENTION

Viewed from one aspect the present invention provides a data processing apparatus comprising:

a plurality of processing units, each processing unit executing a stream of program instructions corresponding to a processing thread; and exception control circuitry configured to control exception processing of a group of said plurality of processor units executing respective processing threads in response to an exception triggering event for said group.

The present technique recognises that within the context of a system implying multiple processing units each executing a stream of program instructions corresponding to a processing thread there exists a need to link together the interrupt behaviour of the individual processing units. The present technique provides exception control circuitry which controls the processing units on a group basis in response to an exception triggering event for a group of processing units. Thus, an exception may be linked to a group of processing units and occurrence of the exception condition (e.g. a physical signal or a software generated interrupt) results in the triggering of exception processing within each of the processing units of that group.

The exception processing triggered by the exception control circuitry within each member of the group is the interruption of execution of the current stream of program instructions, execution of a stream of exception handling program instructions and then resumption of execution of the original program instructions (at the same or a different point). Exception processing is thus distinguished from resetting of the processors as the original processing is resumed after execution of the exception handling program instruction.

It will be appreciated that each of the processing units within the group may have a different state when the exception event triggers and may respond differently during the exception handling. For this reason, the exception control circuitry needs to track the exception processing by each of the processing units. This is achieved by the exception control circuitry controlling traversal by each of the processing units only once for an exception triggering event of a sequence of processing unit exception states. The individual processing units may thus be managed individually and yet in a uniform and coordinated manner.

The sequence of processing unit exception states may comprise in turn a normal state corresponding to processing of the stream of program instructions, an in-exception state corresponding to processing the exception handling program instructions and a done-exception state corresponding to resumed processing of the original stream of program instructions. Other embodiments may have more than three states, for example normal, in-exception, cleaning caches and completing.

The processing units of a group will come to rest in the done-exception state upon completion of their individual exception processing until all of the processing units have started their exception processing whereupon the processing units are returned to the normal state.

The processing units may be made non-responsive to any further exception triggering event while in any of the in-exception state and the done-exception state. This prevents the complication of nested exceptions for the groups.

In order to facilitate control of the different processing units in a convenient manner, each of -the-processing units has associated processing unit state variables indicative of a return program counter value corresponding to a point within the original stream of program instructions where execution is to resume after execution of the exception handling program instructions (this may be the same point or a different point) and a current processing unit exception state indicating which of the normal, in-exception and done-exception states a processing unit currently possesses.

These processing unit state variables may be conveniently stored within respective processing units to facilitate scaling of a design, but may alternatively be stored centrally, such as within the exception control circuitry.

Control of the exception processing of the groups is further facilitated in embodiments in which for a group the exception control circuitry controls traversal in respect of an exception triggering event of a sequence of group exception states.

These group exception states may be a normal state corresponding to processing of respective streams of program instructions by all of the processing units within the group (e.g. each processing unit executing its normal thread), a triggering state corresponding an exception triggering event having occurred but not all of the processing units within the group yet having started exception processing in response to that exception triggering event and a completing state corresponding to starting exception processing by all of the processing units within the group, but not all of the processing units yet having resumed processing of their original stream of program instructions.

The exception control circuitry may move a group from the completion state to the normal state when all of the processing units within that group have resumed processing of their original stream of program instructions. Thus, a group is held in the completing stage until all of the processing units are back to their normal state having resumed processing following exception a the exception handling program instructions.

The processing units within-a group may be non-responsive to any further exception triggering event while in any of the triggering state or the completing state. This prevents nested exceptions within such embodiments.

The control of a group of processing units may be facilitated by the storage of group state variables indicative of a current group exception state, a total number of processing units within a group (which may be dynamically configured, such as by software control) and a counter number indicative of processing units have commenced, but not yet completed the exception processing. These group state variables may be conveniently stored within the exception control circuitry.

In at least some embodiments when each processing unit seeks to schedule a program instruction to be executed the processing unit determines if the current processing unit state is normal and the group state is triggering. If so, then the processing unit changes from the normal state to the in-exception state, saves a current program counter value for the processing unit (for use as a return address) and commences exception processing as well as incrementing the counter value indicative of the number of processing units in the in-exception state.

When the counter value is incremented, this may be compared with the total number of processing units within the group. When the counter value reaches the total number within the group, the group state is changed from triggering to completing as at this point all of the processing units have been triggered to enter the exception processing, but not all have yet completed this exception processing.

As each processor executes a return from exception program instruction, the processing state for that processing unit may be changed to done-exception.

When a processing unit has its state as done-exception and the group state is completing, then the processing unit state may be changed to normal and the counter value may be decremented.

When decrementing the counter value, this is compared with a value of zero and if equal then the group state is changed to normal.

Thus it will be seen that the counter value may increment up to the total number within the group as each processing unit is triggered to start its exception handling and then may decrement back down to zero as each processing unit is detected as having completed its exception processing following the triggering of exception processing within all of the processing units.

Viewed from another aspect the present invention provides a data processing apparatus comprising:

a plurality of processing means for executing program instructions, each processing means executing a stream of program instructions corresponding to a processing thread; and exception control means for controlling exception processing of a group of said plurality of processor means executing respective processing threads in response to an exception triggering event for said group.

Viewed from a further aspect the present invention provides a method of processing data comprising the steps of:

executing program instructions with a plurality of processing units, each processing unit executing a stream of program instructions corresponding to a processing thread; and controlling exception processing of a group of said plurality of processor units executing respective processing threads in response to an exception triggering event for said group.

The above, and other objects, features and advantages of this invention will be apparent from the following detailed description of illustrative embodiments which is to be read in connection with the accompanying drawings.

DESCRIPTION OF EMBODIMENTS

Figure 1:
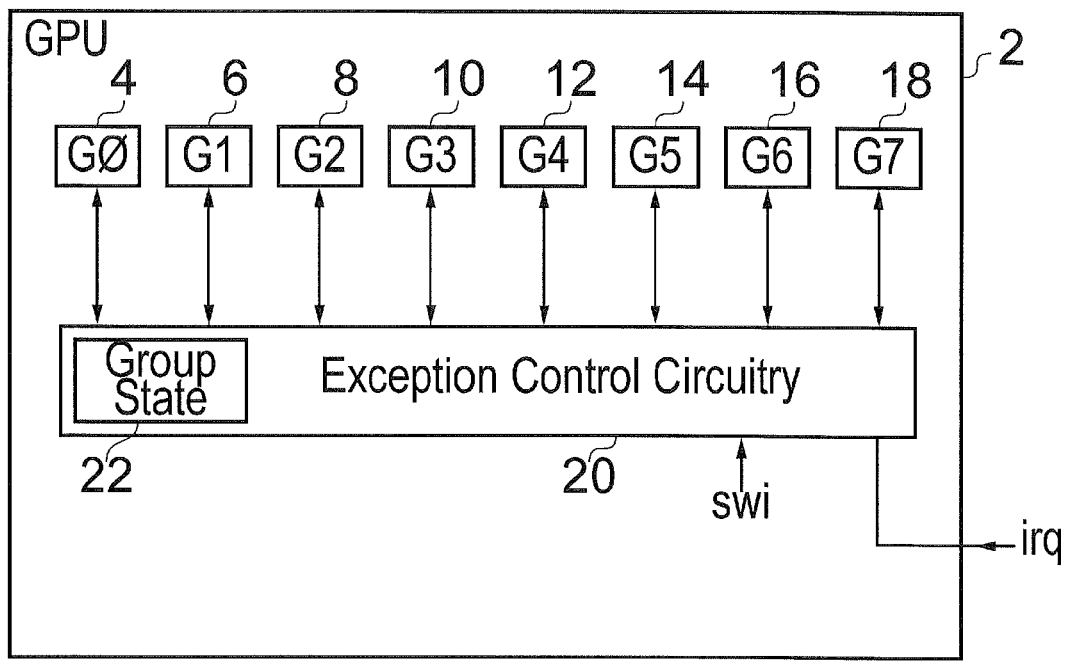
FIG. 1 schematically illustrates a graphics processing unit including multiple processing units for executing separate streams of program instructions corresponding to respective program threads.

FIG. 1 schematically illustrates a graphics processing unit 2 incorporating, in this example, eight graphics processing cores 4, 6, 8, 10, 12, 14, 16, 18. These graphics processing cores 4 to 18 execute respective streams of program instructions each corresponding to a processing thread. The threads may be highly related, and in practice the program instructions may be identical. For example, the different processing threads may correspond to the same processing instructions being executed in respect of different regions within an overall image being processed. It is typical within graphics processing units to have a large number of graphics processing cores 4 to 18 executing in parallel so as to divide down the processing workload and make overall processing throughput higher. It will be appreciated that the graphics processing unit 2 typically includes a large number of further circuit elements, but that these have been omitted from FIG. 1 for the sake of clarity.

Also included within the graphics processing unit 2 is exception control circuitry 20 which is coupled to each of the graphics processing cores 4 to 18. The exception control circuitry 20 is responsive to an interrupt signal, which may be an external interrupt signal irq or an internally generated, interrupt signal, such as a software interrupt swi. The exception control circuitry 20 responds to such an exception triggering signal irq, swi to trigger exception processing within an associated group of processing units (graphics processing cores) linked to that exception triggering event. The group of processing units may be software configured and/or dynamically configured depending upon which processing threads have been allocated and commenced processing upon the graphics processing cores 4 to 18.

As an example, it may be that processing units 4, 8, 10 and 18 are all executing the same program instructions performing a particular shading operation upon different regions within an image being processed. An interrupt, such as a software interrupt swi, then arises with the intention of diverting processing by each of the processing units 4, 8, 10, 18 within the group to-execute exception handling program instructions before resuming the original processing thread which each of those graphics processing cores 4, 8, 10, 18 was executing. The exception control circuitry 20 includes group state storage 22 for storing group state variables tracking which graphics processing cores 4 to 18 are within which groups and the group state of those groups.

Figure 2:
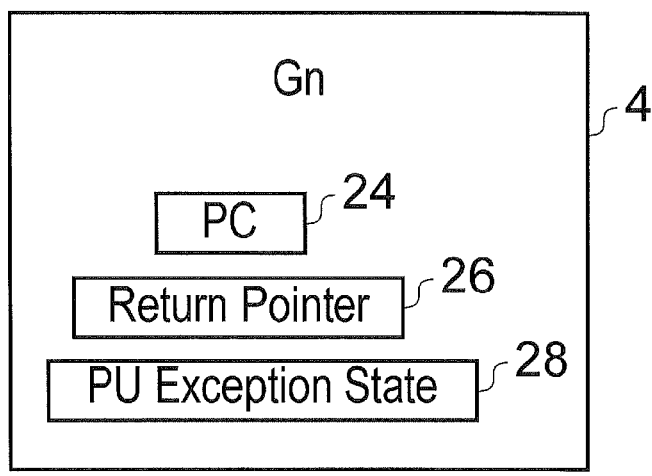
FIG. 2 schematically illustrates processing unit state held within each processing unit.

FIG. 2 illustrates an individual processing unit 4 and shows this as including storage for further state variables including a current program counter 24, a return pointer 26 (indicating an instruction address of an instruction to be executed upon execution of a return from exception handling program instruction at the end of the exception processing) and processing unit exception state 28 (indicating a current exception state of the processing unit 4).

Figure 3:
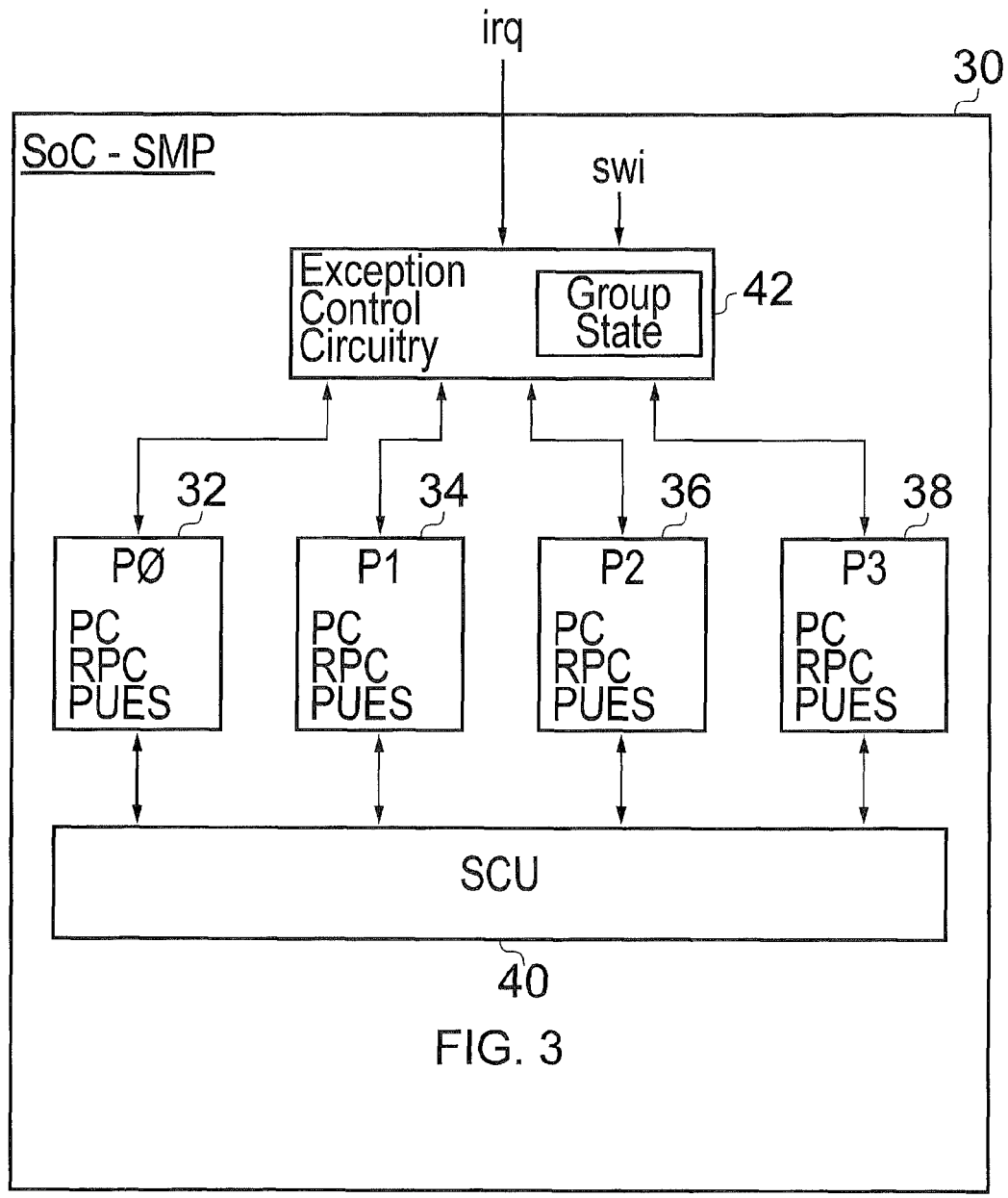
FIG. 3 schematically illustrates a system-on chip symmetric multiprocessing unit incorporating multiple processor cores.

FIG. 3 illustrates another example embodiment. This embodiment consists of a system-on-chip symmetric multi-processing system 30 including multiple general purpose processing cores 32, 34, 36, 38 connected via a snoop control unit 40 and executing respective processing threads in response to their individual stream of program instructions. Each of these general purpose processing cores 32, 34, 36, 38 again stores a current program counter value, a return instruction address and a processing unit exception state variable. The different general purpose processing unit cores 32 to 38 may be formed into groups which are linked in a manner such that an interrupt triggering event (irq, swi) which arises triggers exception processing within each of the processing unit cores 32 to 38 of a group. Exception control circuitry 42 coupled to each of the processing unit cores 32 to 38 is responsive to the exception triggering signals to control the exception processing by the group of processing units concerned.

Figure 4:
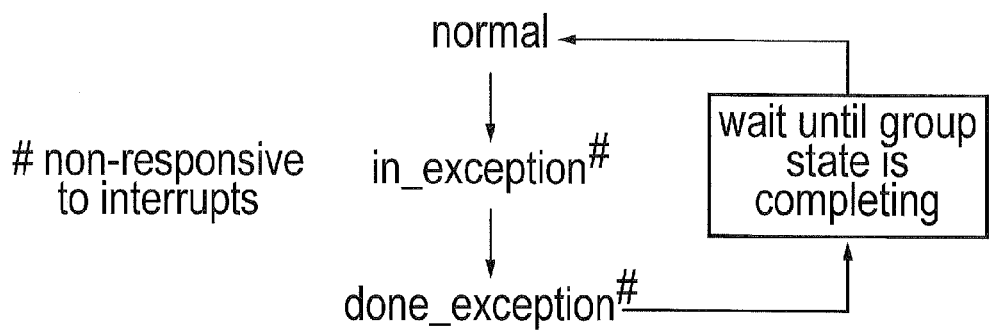
FIG. 4 schematically illustrates processing unit exception states.
Figure 5:
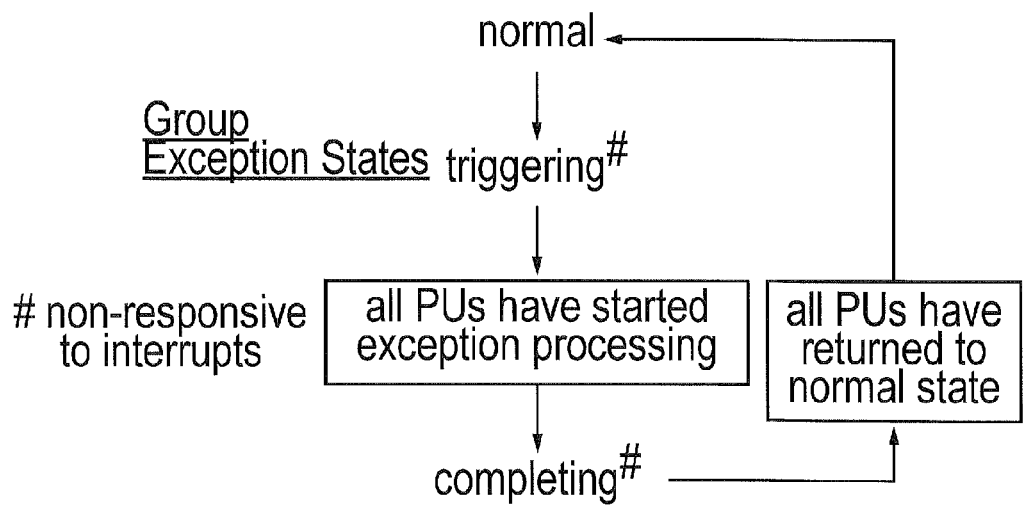
FIG. 5 schematically illustrates group exception states.

FIG. 4 schematically illustrates processing unit exception states which are associated individually with the graphics processing cores 4 to 18 of FIG. 1 and the general purpose processing cores 32 to 38 of FIG. 3. These states which are traversed in sequence as illustrated and only once in respect of each interrupt signal by an individual processing unit are a normal state; an in-exception state; and a done-exception state. The processing unit exception states return from the done-exception state to the normal state when the group state is completing. When in either the in-exception state or the done-exception state, a processing unit will not be responsive to any further interrupts. The exception control circuitry 42 and circuitry within the individual processing unit (although the distribution of this circuitry may vary within different embodiments) are responsible for tracking and controlling the movement of the processing unit exception state between the states illustrated in FIG. 4 in response to an occurrence of an exception handling event FIG. 5 illustrates group exception states for a group of processing units. These states comprise a normal state; a triggering state; and a completing state. The group exception state moves from triggering to completing when all processing units have started their exception processing (as may be tracked using an incrementing counter). The group state moves from completing to normal when all processing units have returned to their normal state as may be tracked by a decrementing counter. When the group is in either the triggering state or the completing state; none of the processing units within that group and the group itself will be responsive to further interrupts.

Figure 6:
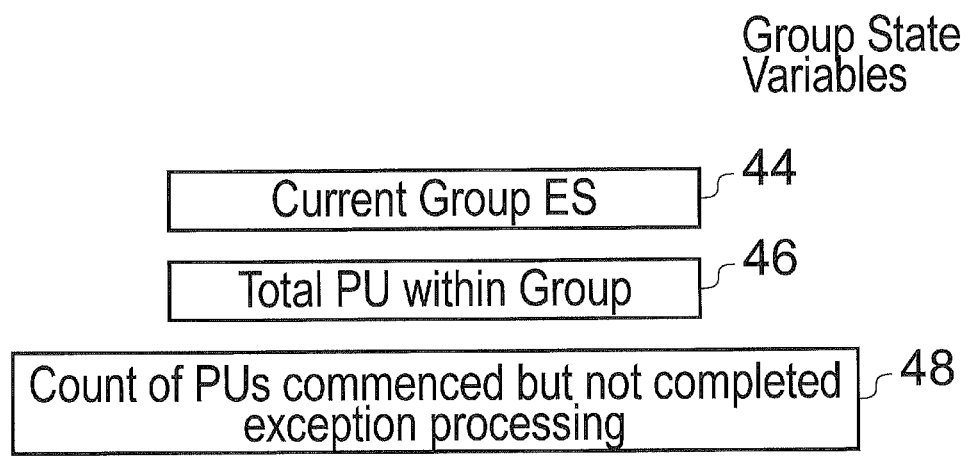
FIG. 6 schematically illustrates group state variables as stored within exception control circuitry.

FIG. 6 schematically illustrates group state variables which may be stored within the exception control circuitry 20, 42 and used to control exception processing by the group of processing units. These state variables include the current group exception state 44, a total number of processing units within the group 46 and a count value 48 (with associated incrementing and decrementing counter) indicating the number of processing units which have commenced but not yet completed their exception processing.

FIGS. 7 to 11 are flow diagrams illustrating the control of exception processing unit state and group state previously referred to as performed by the exception control circuitry 20, 42 and circuitry within the individual processing units 4 to 18 and 32 to 38. It will be appreciated that the circuitry performing the control illustrated in FIGS. 7 to 11 can vary considerably in form and may be provided in different ways between the different parts of the physical implementation. All of these variations are encompassed within the present techniques.

Figure 7:
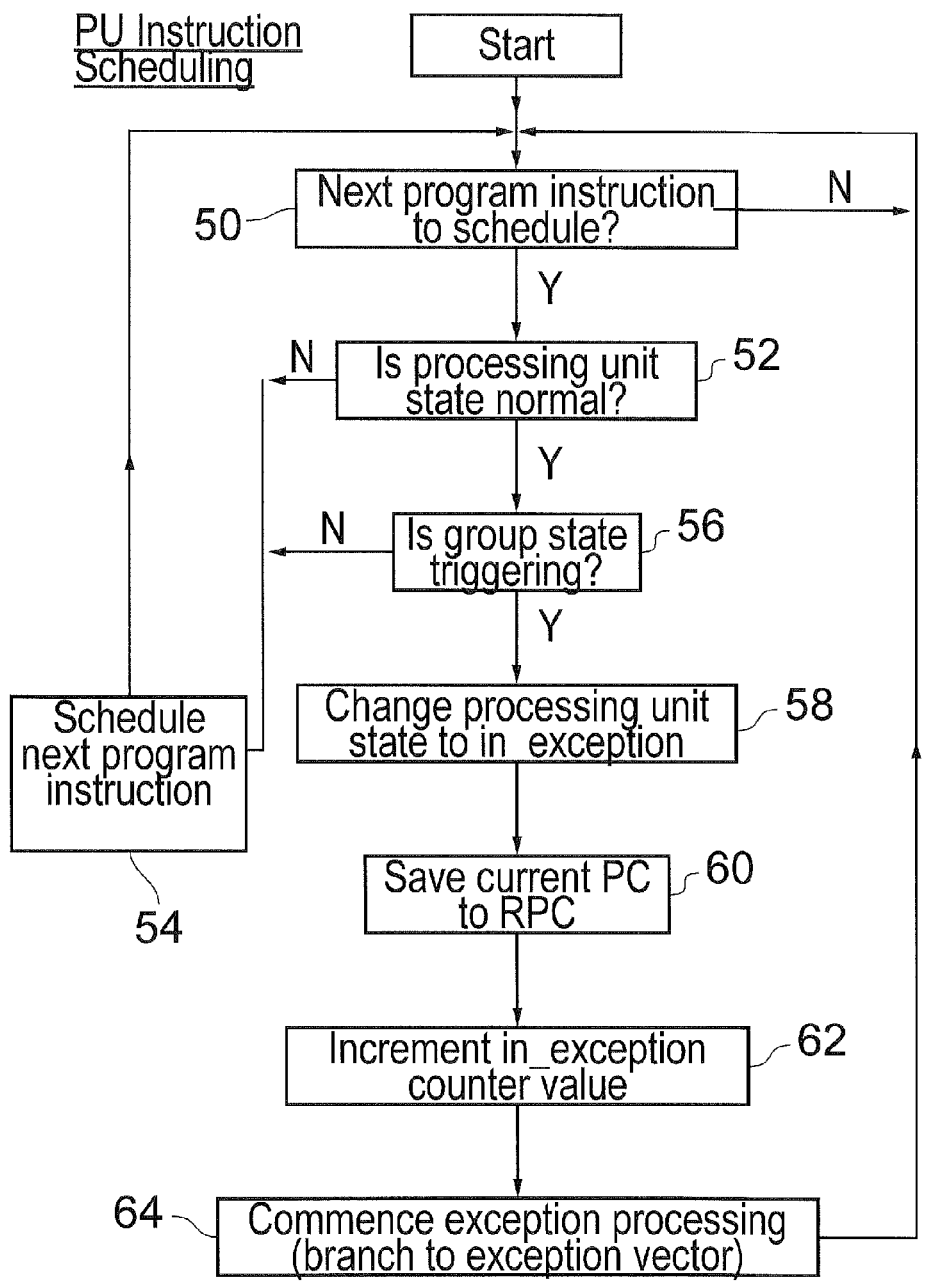
FIG. 7 is a flow diagram schematically illustrating scheduling of program instructions within a processing unit.

FIG. 7 illustrates a processing unit instructing scheduling of a program instruction. At step 50 processing waits until the next program instruction to be scheduled is available (e.g. the previous instruction has completed). Step 52 then determines whether the processing unit is in its normal state. If the processing unit is not in its normal state, then the next program instruction is scheduled for processing at step 54 and processing returns to step 50. If the processing unit is in its normal state as determined at step 52, then step 56 determines whether the group state is currently triggering. If the processing unit state is normal and the group state is triggering as determined at steps 52 and 56, then it is appropriate that the processing unit should commence its exception processing. Otherwise, processing again proceeds to step 54 and the next program instruction is scheduled.

If the determination at step 56 is that the group state is triggering, then step 58 changes the processing unit state to in-exception. Step 60 saves the current program counter value to the return program counter address such that a return from exception processing can be made after the exception handling routine has been executed. It will be appreciated that a return may also be made to a different point in some embodiments. At step 62 the group tracking counter value is incremented to note that another processing unit has entered the in-exception state. At step 64 execution of the exception handling program instructions is commenced (e.g. a branch to an exception vector). Processing then returns to step 50.

Figure 8:
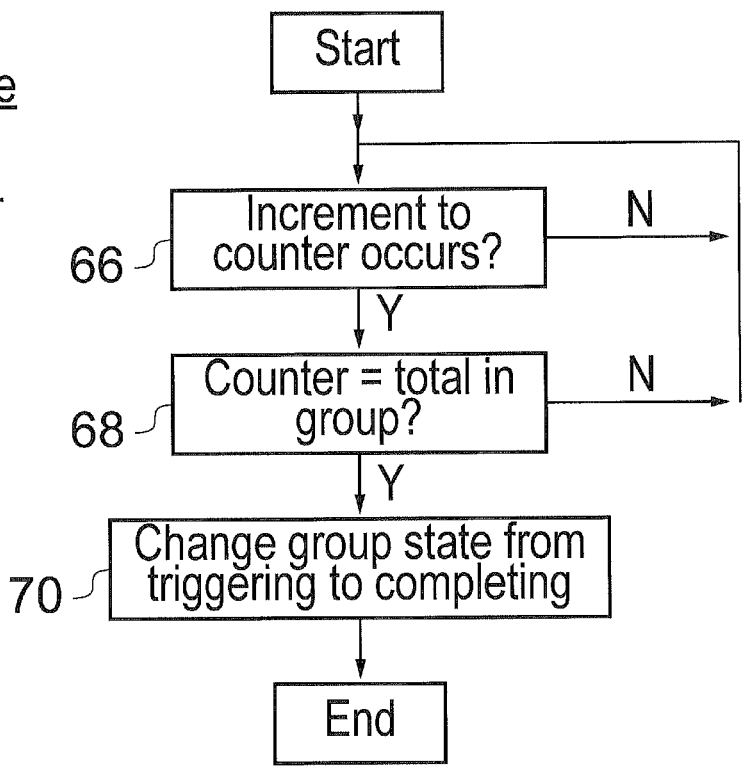
FIG. 8 is a flow diagram schematically illustrating control of group state moving from a triggering state to a completing state.

FIG. 8 illustrates control of the group state in moving to completing. When an exception is first detected, such as a physical interrupt signal irq or a software interrupt swi, then the group state is moved from normal to triggering. Subsequently, step 66 determines when an increment to the counter value occurs (see step 62 of FIG. 7). Each time such an increment occurs, step 68 determines whether the counter value has yet reached the total number of processing units within the group associated with the exception being tracked. When the counter value reaches this total group number value, then step 70 changes the group state from triggering to completing as at this point all of the processing units within the group have been triggered to commence exception program instruction execution and accordingly will be at least some way along toward completing that exception processing.

Figure 9:
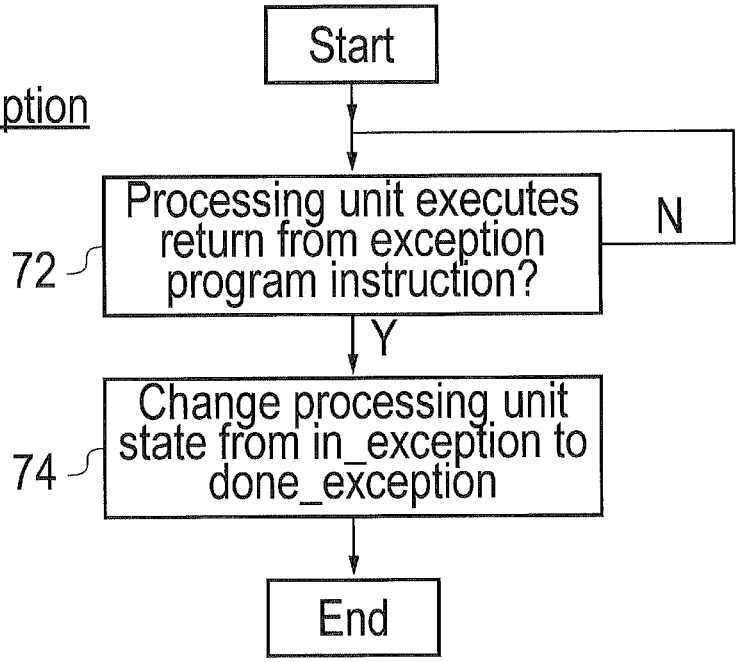
FIG. 9 is a flow diagram schematically illustrating control of processing unit state moving from in-exception to done-exception.

FIG. 9 illustrates control of the processing unit state moving from in-exception to done-exception. Step 72 detects when the processing unit executes a return from exception program instruction. Such a program instruction may, for example, seek to restore the saved return program counter value to the current program counter so as to redirect the program flow back to the original program flow. When a return from exception program instruction is detected at step 72, then step 74 changes the processing unit state of the processing unit concerned from in-exception to done-exception. The processing unit remains non-responsive to interrupts whilst in the done-exception state and will not return to the normal state until all of the processing units with the group concerned have started exception processing (corresponding with the completing group state). This helps preserve the ordering of interrupt processing since none of the processing units will respond to a further interrupt while the group is in the completing state.

Figure 10:
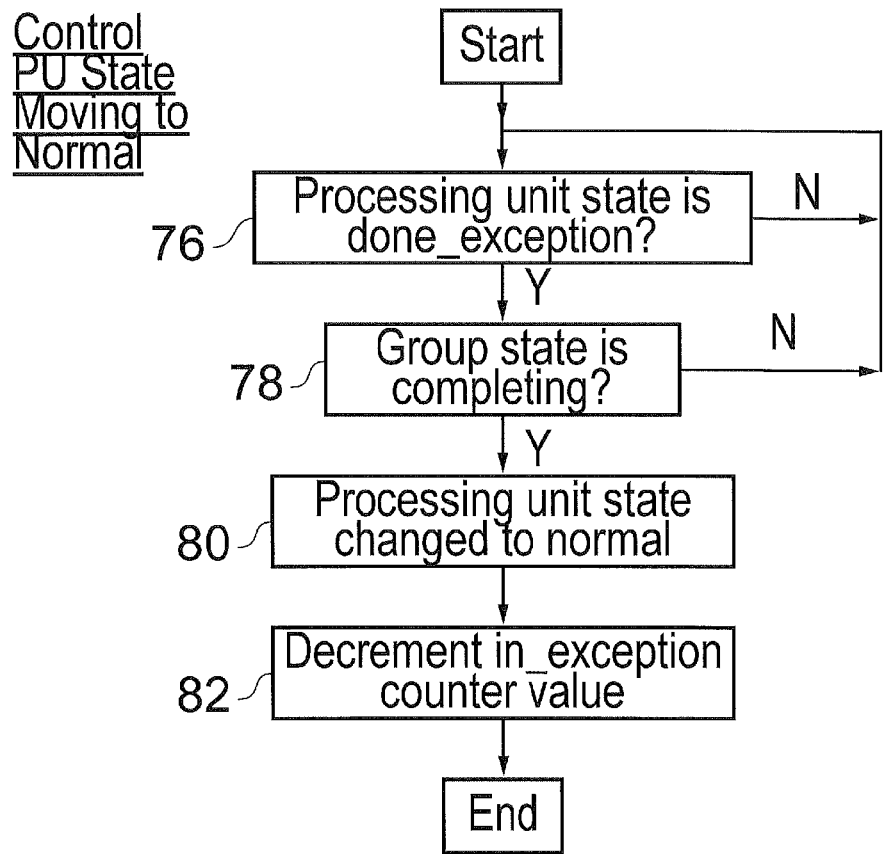
FIG. 10 is a flow diagram schematically illustrating control of processing unit state moving from done-exception to normal.

FIG. 10 illustrates control of moving of the processing unit state from done-exception to normal. In respect of a processing unit, step 76 determines whether or not the exception state is done-exception. Step 78 then determines whether or not the group state is completing. If both the processing unit state is done-exception and the group state is completing, then processing proceeds to step 80 where the processing unit state for that processing unit is changed from done-exception to normal. Step 82 then decrements the counter value.

Figure 11:
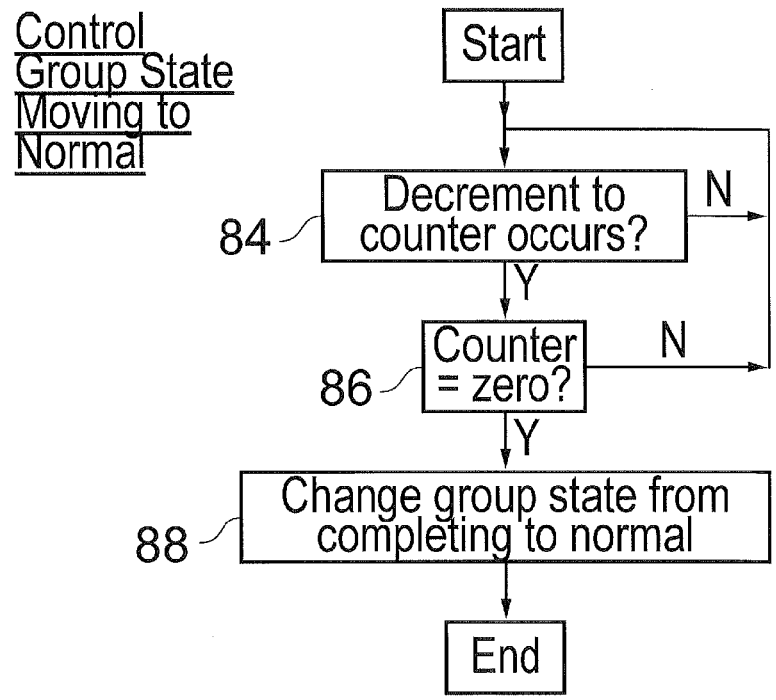
FIG. 11 is a flow diagram schematically illustrating control of group state moving from completing to normal.

FIG. 11 illustrates control of the group state moving from completing to normal. Step 84 detects when a decrement of the counter value has occurred (see step 82 of FIG. 10). When such a decrement has occurred, then step 86. determines whether the counter value has reached zero. When the counter value does reach zero as determined at step 86, then step 88 changes the group state from completing to normal as at this point all of the processing units within the group will have changed from done-exception to normal state and accordingly the group can change from completing to normal and become responsive once more to further exception signals.

The techniques may be used in systems in which a plurality of processing units can change state in the same clock cycle. In this case the counter managing the count value 48 may be incremented or decremented in arbitrary amount depending upon how many processing units have changed state within that clock cycle. In an alternative embodiment the count value 48 may be represented by an array of bits with one bit corresponding to each processing unit. The bits may all be initialised to zero and then set to one as a corresponding processing unit enters the in-exception state. As each processing unit moves from done-exception to normal it clears its corresponding bit. When all the bits are clear the group state moves to normal. When the group state moves from normal to triggering, this triggers each processing unit to enter the in-exception state and hence cause the corresponding bit to be set.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:

a plurality of processing units, each processing unit executing a stream of program instructions corresponding to a processing thread;

a plurality of groups comprising the plurality of processing units, wherein each processing unit is in one of said plurality of groups; and exception control circuitry configured to control exception processing of a group of said plurality of groups in response to an exception triggering event that corresponds with only said group out of said plurality of groups, wherein said exception control circuitry is configured to control each processing unit of said processing units within said group to respond to said exception triggering event by in sequence interrupting execution of said stream of program instructions associated with that processing unit, executing a stream of exception handling program instructions to perform exception processing, and resuming execution of said stream of program instructions associated with that processing unit, wherein for each processing unit of said processing units within said group said exception control circuitry is configured to control traversal only once for said exception triggering event of a sequence of processing unit exception states, wherein said sequence of processing unit exception states are in turn:

(i) normal corresponding to processing of said stream of program instructions associated with that processing unit;

(ii) in-exception corresponding to processing of said exception handling program instructions; and (iii) done-exception corresponding to resumed processing of said stream of program instructions associated with that processing unit; and wherein said exception control circuitry is configured to move all of said processing units within said group from said done-exception state to said normal state upon starting of exception processing by all of said processing units within said group.

2. A data processing apparatus as claimed in claim 1, wherein a processing unit is non-responsive to any further exception triggering event while in any of said in-exception state and said done-exception state.

3. A data processing apparatus as claimed in claim 1, wherein each of said plurality of processing units has associated processing unit state variables indicative of:

(i) a return program counter value corresponding to a point within said stream of program instructions associated with said processing unit where execution is to resume after execution of said exception handling program instructions; and (ii) a current processing unit exception state of said processing unit.

4. A data processing apparatus as claimed in claim 3, wherein said processing unit state variables are stored within respective processing units.

5. A data processing apparatus as claimed in claim 1, wherein for said group said exception control circuitry controls traversal for said exception triggering event of a sequence of group exception states.

6. A data processing apparatus as claimed in claim 5, wherein said sequence of group exception states are in turn:
(i) normal corresponding to processing of respective streams of program instructions by all of said processing units within said group;
(ii) triggering corresponding to an exception triggering event having occurred and not all of said processing units within said group having yet started exception processing; and
(iii) completing corresponding to exception processing by all of said processing units within said group having been started, but not all of said processing units have yet resumed processing of said stream of program instructions.

7. A data processing apparatus as claimed in claim 6, wherein said exception control circuitry moves said group from said completing state to said normal state when each processing unit of said processing units within said group has resumed processing of said stream of program instructions associated with said processing unit.

8. A data processing apparatus as claimed in claim 6, wherein said group is non-responsive to any further exception triggering event while in any of said triggering state and said completing state.

9. A data processing apparatus as claimed in claim 6, wherein said group has associated group state variables indicative of:
(i) a current group exception state of said group;
(ii) a total number of processing units within said group;
(iii) a counter value indicative of a number of processing units that have commenced but not completed said exception processing.

10. A data processing apparatus as claimed in claim 9, wherein said group state variables are stored within said exception control circuitry.

11. A data processing apparatus as claimed in claim 9, wherein for each processing unit of said processing units within said group said exception control circuitry controls traversal only once for said exception triggering event of a sequence of processing unit exception states, wherein said sequence of processing unit exception states are in turn:
(i) normal corresponding to processing of said stream of program instructions associated with said processing unit;
(ii) in-exception corresponding to processing of said exception handling program instructions; and
(iii) done-exception corresponding to resumed processing of said stream of program instructions, wherein as each processing unit within said group schedules a program instruction within said stream of program instructions associated with said processing unit, said processing unit determines whether or not said processing unit's state is normal and said group's state is triggering and when so then changes said processing unit's state to in-exception, saves a current program counter value for said processing unit, commences said exception processing and increments said counter value.

12. A data processing apparatus as claimed in claim 11, wherein upon said incrementing of said counter value, said counter value is compared with said total number and when equal, then said group's state is changed to completing.

13. A data processing apparatus as claimed in claim 9, wherein for each processing unit of said processing units within said group said exception control circuitry controls traversal only once for said exception triggering event of a sequence of processing unit exception states, wherein said sequence of processing unit exception states are in turn:
(i) normal corresponding to processing of said stream of program instructions associated with said processing unit;
(ii) in-exception corresponding to processing of said exception handling program instructions; and
(iii) done-exception corresponding to resumed processing of said stream of program instructions associated with said processing unit, wherein when a processing unit state is done-exception and said group's state is completing, then said processing unit state is changed to normal and said counter value is decremented.

14. A data processing apparatus as claimed in claim 13, wherein upon said decrementing of said counter value, said counter value is compared with zero and when equal, then said group's state is changed to normal.

15. A data processing apparatus as claimed in claim 1, wherein when said processor unit state of a processing unit is in-exception and said processing unit executes a return from exception program instruction, then said processing unit's state is changed to done-exception.

16. A data processing apparatus comprising:
a plurality of processing means for executing program instructions, each processing means executing a stream of program instructions corresponding to a processing thread;
a plurality of groups comprising the plurality of processing means, wherein each processing means is in one of said plurality of groups; and
exception control means for controlling exception processing of a group of said plurality of groups in response to an exception triggering event that corresponds with only said group out of said plurality of groups wherein said exception control means is configured to control each of said processing means within said group to respond to said exception triggering event by in sequence interrupting execution of said stream of program instructions associated with that processing means, executing a stream of exception handling program instructions to perform exception processing, and resuming execution of said stream of program instructions associated with that processing means,
wherein for each processing means of said processing means within said group said exception control means is configured to control traversal only once for said exception triggering event of a sequence of processing means exception states,
wherein said sequence of processing means exception states are in turn:
(i) normal corresponding to processing of said stream of program instructions associated with that processing means;
(ii) in-exception corresponding to processing of said exception handling program instructions; and
(iii) done-exception corresponding to resumed processing of said stream of program instructions associated with that processing means; and
wherein said exception control means is configured to move all of said processing means within said group from said done-exception state to said normal state upon starting of exception processing by all of said processing means within said group.

17. A method of processing data comprising the steps of:
executing program instructions with a plurality of processing units, each processing unit executing a stream of program instructions corresponding to a processing thread, wherein a plurality of groups comprise the plurality of processing units and each processing unit is in one of said plurality of groups;
controlling exception processing of a group of said plurality of groups in response to an exception triggering event that corresponds with only said group out of said plurality of groups; and
controlling each processing unit of said processing units within said group to respond to said exception triggering event by in sequence interrupting execution of said stream of program instructions associated with that processing unit, executing a stream of exception handling program instructions to perform exception processing, and resuming execution of said stream of program instructions associated with that processing unit, wherein for each processing unit of said processing units within said group said step of controlling controls traversal only once for each exception triggering event of a sequence of processing unit exception states,
wherein said sequence of processing unit exception states are in turn:
(i) normal corresponding to processing of said stream of program instructions associated with that processing unit;
(ii) in-exception corresponding to processing of said exception handling program instructions; and
(iii) done-exception corresponding to resumed processing of said stream of program instructions associated with that processing unit; and
wherein all of said processing units within said group are moved from said done-exception state to said normal state upon starting of exception processing by all of said processing units within said group.

* * * * *